July 12, 1955   W. D. WHITE   2,713,107
WELDING ROD HOLDER
Filed Nov. 12, 1953
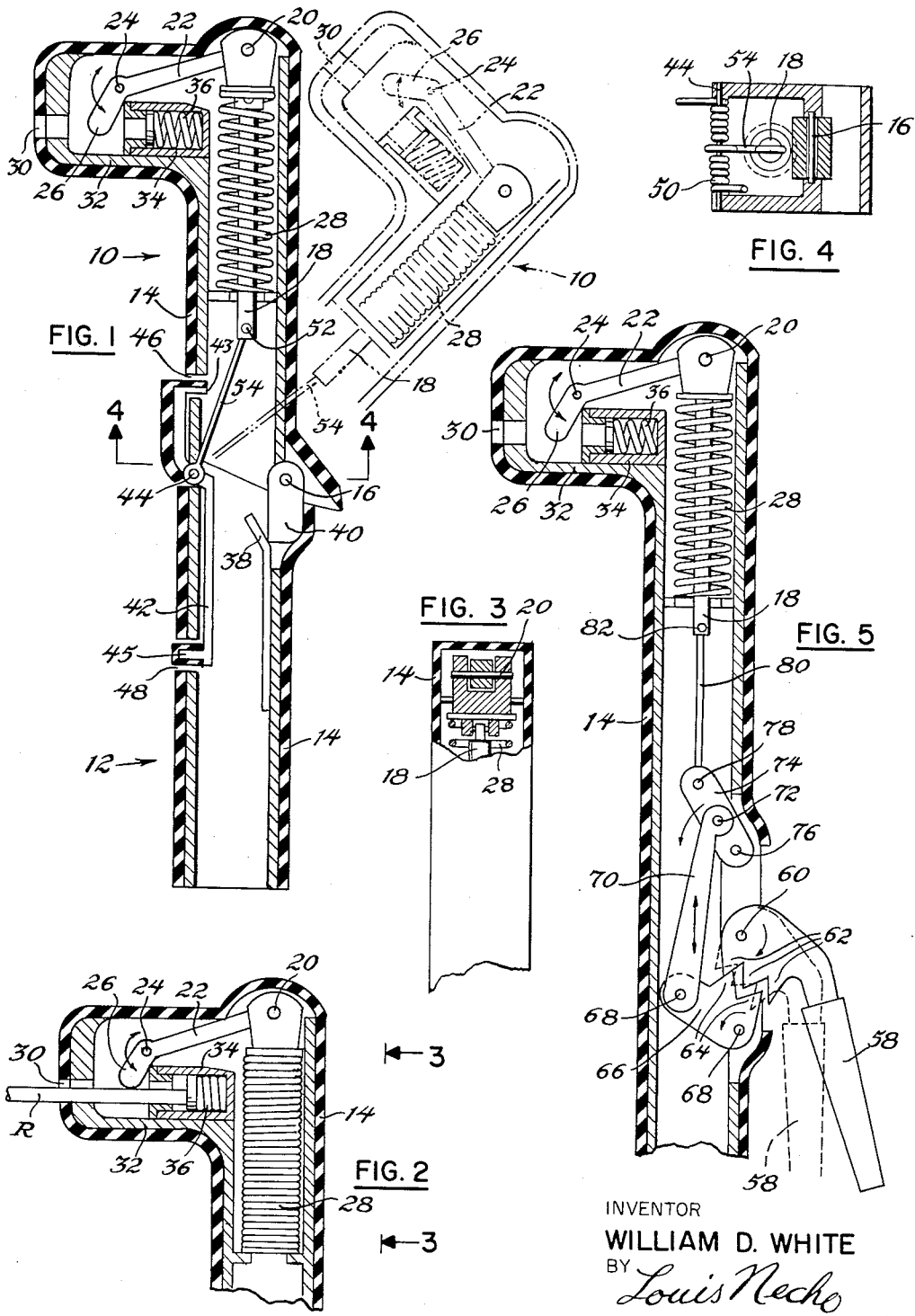
INVENTOR
WILLIAM D. WHITE
BY Louis Necho
ATTORNEY

United States Patent Office 2,713,107
Patented July 12, 1955

2,713,107

WELDING ROD HOLDER

William D. White, Mount Ephraim, N. J.

Application November 12, 1953, Serial No. 391,457

4 Claims. (Cl. 219—8)

My invention relates to a clamp, or holder, of the type used for holding a welding rod.

The object of the invention is to produce an improved holder of the type set forth.

The full nature of the invention will be understood from the following specification and the accompanying drawings in which:

Fig. 1 is a longitudinal sectional view of a holder showing one embodiment of the invention.

Fig. 2 is a view of the upper portion of Figs. 1 and 5 showing the device as it appears when gripping a welding rod.

Fig. 3 is a view, partly in section and partly in elevation, looking in the direction of line 3—3 on Fig. 2.

Fig. 4 is a sectional view taken on line 4—4 on Fig. 1.

Fig. 5 is similar to Fig. 1 but showing another embodiment of the invention.

The holder shown in Fig. 1 includes a casing formed of a welding rod holding portion 10 and a handle portion 12, both of which are electrically insulated by a covering 14 made of rubber or the like. The parts 10 and 12 of the holder are hinged together at 16 to permit movement of the part 10 from the solid to the dotted line position of Fig. 1 and back.

The welding rod clamping mechanism includes a rod 18 to the enlarged outer end of which is pivoted as at 20, one end of a lever 22 which is fulcrumed at 24 and provided with a bent end portion 26. The rod 18 is normally biased upwardly, as viewed in Fig. 1, by a spring 28 so as normally to move lever 22 in counterclockwise direction as viewed in Fig. 1. In this position the bent tip 26 of the lever obstructs opening 30 in the wall of the lateral extension 32 of the casing which houses lever 22. The extension 32 also houses a sleeve 34 which encloses a compression spring 36 the function of which will be later on explained. The hinged portions 10 and 12 are normally biased to the solid line position of Fig. 1 by a spring 38 which bears against a block or arm 40 carried by the casing portion 10.

The portions 10 and 12 of the casing are locked in the solid position of Fig. 1 by means of a lever 42 which is fulcrumed on shaft 44 and one end 43 of which engages a hole 46 in portion 10 and the other end 45 of which engages a hole 48 in portion 12 of the casing. The shaft 44 is carried by casing portion 12 and lever 42 is biased to its locking position by a spring 50 which is shown in Fig. 4.

The inner end of rod 18 is pivoted, at 52, to one end of a link 54 the other end of which is pivoted on shaft 44 which carries the locking lever 42 above mentioned. When it is desired to move part 10 of the casing to the broken line position of Fig. 1, the end 45 of lever 42 is pushed inwardly so as to withdraw the other end 43 thereof from hole 46. It will be noted that, when casing portion 10 is moved to the broken line position of Fig. 1, the bent end 26 of lever 22 is out of registration with opening 30 and spring 28 is compressed. A welding rod R can now be inserted through opening 30 and into sleeve 34, until it compresses spring 36. When the parts are returned to the solid line position of Fig. 1, spring 28 expands and rotates lever 22 in counter-clockwise direction so as to cause the bent tip 26 of lever 22 to bear against the welding rod as shown in Fig. 2. When the parts are moved to the broken line position of Fig. 1, spring 36 expands and ejects the welding rod.

The structure described is especially adapted for use in tight places where freedom of movement is not possible such as in boilers and in small corners and so forth. This is due to the fact that by holding the part 12 and pressing the part 10 against any available rigid object, the hot stump of a used up rod is automatically ejected and a new rod is easily placed in position.

The welding rod gripping mechanism in the embodiment of Fig. 5 is the same as that of Fig. 1 and hence it will not be described and the parts of this mechanism are referred to by the same reference numerals.

The operating mechanism of the embodiment of Fig. 5 includes a lever 58 which is fulcrumed at 60 to a wall of the casing. It will be noted that the casing in this case is made in one piece. The lever 58 is provided with teeth 62 adapted to engage the teeth 64 of a ratchet 66 one end of which is fulcrumed at 68 to the wall of the casing. The other end of ratchet 66 is pivotally connected, at 68, to one end of a link 70 the other end of which is pivoted as at 72 to a rocker arm 74. One end of rocker arm 74 is pivoted at 76 to the wall of the casing and the other end thereof is pivoted, as at 78 to one end of rod 80 the other end of which is pivoted as at 82 to a rod 18. The operation of this embodiment is as follows:

Pressing lever 58 against the body of the holder, rotates ratchet 66 in counterclockwise direction, as viewed in Fig. 5. This movement of the ratchet pulls link 70 and rotates rocker arm 74, in counterclockwise direction about pivot 76, as viewed in Fig. 5. This rotation of rocker arm 74 pulls link 80, and rod 18 so as to rotate lever 22 about fulcrum 24 to move the tip 26 of lever 22 out of registration with opening 30. Upon release of lever 58, the return movement of spring 28 rotates lever 22 in a counterclockwise direction and causes its tip 26 to clamp the rod as shown in Fig. 2.

What I claim is:

1. A welding rod holder including an elongated casing having a welding rod receiving opening in a side thereof, a sleeve in said casing in alignment with said opening for receiving the end of a welding rod, a lever in said casing and having one end thereof bent at an angle to the axis thereof, means fulcruming said lever for movement to a first position in which said bent end of said lever will obstruct said opening and to a second position in which said bent end of said lever is out of registration with said opening, a rod located in said casing and disposed substantially transversely of the axis of said opening, means pivotally connecting the other end of said lever to one end of said rod, means normally biasing said rod to a first position to move said lever to its first position, and actuating means for moving said rod to a second position, against the action of said biasing means, to move said lever to its second position.

2. The structure recited in claim 1 and means located in said sleeve and operable to expel said welding rod when said lever is moved to its said second position.

3. The structure referred to in claim 1 in which said casing is made of a first portion and a second portion, and hinge means hingedly connecting said portions together, said lever, said sleeve, and said rod being carried by one of said portions and said actuating means being secured to and carried by the other of said portions and means hingedly connecting said actuating means to said rod, the relations and dimensions of said casing portions, said rod and said actuating means being such that, when said portions are moved in one direction about said hinge means, said actuating means moves said rod to its second position and vice versa.

4. The structure recited in claim 3 and spring means normally resisting movement of the casing portions in said one direction.

References Cited in the file of this patent

UNITED STATES PATENTS

| Number | Name | Date |
|---|---|---|
| 2,162,112 | Nickels | June 13, 1939 |
| 2,186,158 | Weeks | Jan. 9, 1940 |
| 2,304,321 | Wagner | Dec. 8, 1942 |
| 2,383,951 | Bass | Sept. 4, 1945 |
| 2,485,360 | Colinet | Oct. 18, 1949 |